(12) United States Patent
Reitnouer

(10) Patent No.: US 11,440,476 B2
(45) Date of Patent: *Sep. 13, 2022

(54) EXTENDABLE/RETRACTABLE STEP ASSEMBLY FOR A REAR ASSEMBLY OF A FLATBED TRAILER

(71) Applicant: Miles A. Reitnouer, Birdsboro, PA (US)

(72) Inventor: Miles A. Reitnouer, Birdsboro, PA (US)

( * ) Notice: Subject to any disclaimer, the term of this patent is extended or adjusted under 35 U.S.C. 154(b) by 211 days.

This patent is subject to a terminal disclaimer.

(21) Appl. No.: 16/876,696

(22) Filed: May 18, 2020

(65) Prior Publication Data

US 2021/0178974 A1 Jun. 17, 2021

Related U.S. Application Data

(63) Continuation of application No. 16/717,521, filed on Dec. 17, 2019, now Pat. No. 10,710,508.

(51) Int. Cl.
*B60R 3/02* (2006.01)
*B60T 13/26* (2006.01)
*B62D 21/20* (2006.01)

(52) U.S. Cl.
CPC .............. *B60R 3/02* (2013.01); *B60T 13/263* (2013.01); *B62D 21/20* (2013.01)

(58) Field of Classification Search
CPC .......... B60R 3/02; B60T 13/263; B62D 21/20
See application file for complete search history.

(56) References Cited

U.S. PATENT DOCUMENTS

| | | | | |
|---|---|---|---|---|
| 2,642,217 A | * | 6/1953 | Jennings | B60R 3/02 280/166 |
| 3,756,622 A | * | 9/1973 | Pyle | B60R 3/02 280/166 |
| 3,853,369 A | * | 12/1974 | Holden | B60R 3/02 280/166 |
| 3,887,217 A | * | 6/1975 | Thomas | B60R 3/02 280/166 |
| 3,997,211 A | * | 12/1976 | Graves | B60R 3/02 182/116 |
| 4,071,260 A | | 1/1978 | Marshall, Sr. | |

(Continued)

FOREIGN PATENT DOCUMENTS

| | | |
|---|---|---|
| DE | 4329614 | 3/1995 |
| DE | 102006056755 | 6/2008 |

(Continued)

OTHER PUBLICATIONS

English abstract of DE102006056755.
English abstract of DE4329614.

*Primary Examiner* — Jacob B Meyer
(74) *Attorney, Agent, or Firm* — Caesar Rivise, PC

(57) ABSTRACT

An extendable/retractable step assembly mounted at the rear assembly of a flatbed trailer to permit access to and from the ground to the flatbed trailer. The extendable/retractable stair assembly includes a pair of steps that are staggered and can be extended out of the rear assembly during use and then retracted therein when not in use. The steps can be manually extended/retracted or they can be automatically controlled. A safety interlock is also disclosed to automatically retract the steps when the trailer emergency brakes are released.

8 Claims, 11 Drawing Sheets

(56) References Cited

U.S. PATENT DOCUMENTS

| | | | |
|---|---|---|---|
| 4,139,078 A * | 2/1979 | Keller | E06C 5/02 |
| | | | 280/166 |
| 4,185,849 A | 1/1980 | Jaeger | |
| 4,274,648 A | 6/1981 | Robins | |
| 5,205,603 A * | 4/1993 | Burdette, Jr. | B60R 3/02 |
| | | | 182/195 |
| 5,228,707 A * | 7/1993 | Yoder | B60R 3/02 |
| | | | 182/127 |
| 5,312,150 A | 5/1994 | Quam | |
| 5,366,052 A * | 11/1994 | Keh-Lin | E06C 5/02 |
| | | | 182/127 |
| 5,584,493 A | 12/1996 | Demski et al. | |
| 5,697,470 A * | 12/1997 | Carle | E06C 1/005 |
| | | | 182/35 |
| 5,803,475 A * | 9/1998 | Dick | B60R 3/007 |
| | | | 280/166 |
| 5,868,412 A * | 2/1999 | Hinkle | B60R 3/00 |
| | | | 296/62 |
| 6,178,364 B1 * | 1/2001 | Delurey | B60R 3/02 |
| | | | 280/166 |
| 6,264,222 B1 * | 7/2001 | Johnston | B60R 3/02 |
| | | | 182/127 |
| 6,270,139 B1 * | 8/2001 | Simpson | B60P 1/435 |
| | | | 296/62 |
| 6,505,708 B2 * | 1/2003 | LaBrash | E06C 5/02 |
| | | | 182/95 |
| 6,880,843 B1 | 4/2005 | Greer, Jr. | |
| 6,905,158 B1 * | 6/2005 | Bastian | B62D 33/0273 |
| | | | 296/62 |
| 7,025,174 B1 * | 4/2006 | Hawley | B60R 3/02 |
| | | | 182/127 |
| 7,111,858 B2 * | 9/2006 | Manser | B60R 3/02 |
| | | | 182/127 |
| 7,168,722 B1 * | 1/2007 | Piotrowski | B60R 3/02 |
| | | | 280/166 |
| 7,261,357 B1 * | 8/2007 | Bechen | B60R 3/02 |
| | | | 296/57.1 |
| 7,422,263 B2 * | 9/2008 | Pritchard | B60R 3/02 |
| | | | 280/166 |
| 7,448,637 B2 * | 11/2008 | Parker | E06C 1/005 |
| | | | 280/166 |
| 7,516,997 B2 * | 4/2009 | Kuznarik | B62D 33/0273 |
| | | | 182/127 |
| 7,673,922 B1 * | 3/2010 | Grimes | B60R 3/02 |
| | | | 280/166 |
| 7,766,357 B2 * | 8/2010 | Arvanites | B60R 3/007 |
| | | | 182/127 |
| 7,926,827 B2 | 4/2011 | Kircher | |
| 8,251,178 B2 * | 8/2012 | Krobot | B60R 3/02 |
| | | | 182/127 |
| 8,297,635 B2 | 10/2012 | Agoncillo et al. | |
| 8,556,283 B2 * | 10/2013 | Coochesfahani | B60R 3/02 |
| | | | 105/449 |
| 8,662,512 B2 | 3/2014 | May | |
| 8,678,411 B2 * | 3/2014 | Kibler | B60R 3/02 |
| | | | 182/127 |
| 8,696,005 B2 * | 4/2014 | Kim | B60R 3/02 |
| | | | 280/166 |
| 8,991,842 B1 * | 3/2015 | Teno, III | B60R 3/02 |
| | | | 280/163 |
| 9,010,473 B1 * | 4/2015 | Rasmussen | B60R 3/02 |
| | | | 180/166 |
| 9,022,405 B2 * | 5/2015 | Kibler | B60R 3/02 |
| | | | 182/127 |
| 9,487,147 B1 * | 11/2016 | Morrill | B60R 3/02 |
| 9,487,148 B2 * | 11/2016 | Kichline, Jr. | B60R 3/02 |
| 9,527,448 B1 * | 12/2016 | Kay | B60R 3/02 |
| 9,623,915 B2 * | 4/2017 | Worden | E05D 11/1014 |
| 10,099,622 B2 * | 10/2018 | Handschke | B60R 3/02 |
| 10,124,735 B2 | 11/2018 | Du et al. | |
| 10,300,829 B2 | 5/2019 | Corrigan et al. | |
| 10,434,949 B2 * | 10/2019 | Handschke | B62D 39/00 |
| 10,518,708 B1 * | 12/2019 | Honer | B60R 3/02 |
| 10,525,891 B1 * | 1/2020 | Honer | B60R 3/02 |
| 10,604,078 B2 * | 3/2020 | Hedley | E06C 7/182 |
| 10,710,508 B1 * | 7/2020 | Reitnouer | B60T 17/22 |
| 2006/0006023 A1 * | 1/2006 | Lim | B60R 3/02 |
| | | | 182/127 |
| 2013/0193666 A1 * | 8/2013 | Kibler | B60R 3/02 |
| | | | 182/127 |
| 2014/0167379 A1 * | 6/2014 | Kibler | E06C 5/06 |
| | | | 280/166 |
| 2015/0097353 A1 * | 4/2015 | Rasmussen | B60R 3/02 |
| | | | 280/166 |
| 2015/0329055 A1 * | 11/2015 | Clanton | B60R 3/02 |
| | | | 280/166 |
| 2017/0298675 A1 * | 10/2017 | Dimig | B60Q 1/0023 |
| 2018/0265008 A1 | 9/2018 | Spahn et al. | |
| 2019/0184901 A1 * | 6/2019 | Hedley | E06C 1/54 |
| 2021/0178974 A1 * | 6/2021 | Reitnouer | B60T 13/263 |

FOREIGN PATENT DOCUMENTS

| | | | |
|---|---|---|---|
| DE | 102014212988 | 1/2016 | |
| DE | 102014212988 A1 * | 1/2016 | B60R 3/02 |
| WO | WO-2018142329 A1 * | 8/2018 | B60R 3/007 |

* cited by examiner

EXTENDABLE/RETRACTABLE STEP ASSEMBLY FOR A REAR ASSEMBLY OF A FLATBED TRAILER

CROSS-REFERENCE TO RELATED APPLICATIONS

This Continuation application claims the benefit under 35 U.S.C. § 120 of application Ser. No. 16/717,521 filed on Dec. 17, 2019 entitled "EXTENDABLE/RETRACTABLE STEP ASSEMBLY FOR A REAR ASSEMBLY OF A FLATBED TRAILER" and whose entire disclosure is incorporated by reference herein.

BACKGROUND OF THE INVENTION

The present invention relates trailers and more particularly to an extendable/retractable step assembly at the rear assembly of a flatbed trailer for providing access to and from the ground to the flatbed trailer.

Flatbed trailers typically have decks that are at least four feet off the ground so gaining access to the trailer bed in the absence of a loading dock or step ladder, etc., can be difficult. Solutions proposed for this problem are disclosed in U.S. Pat. No. 4,071,260 (Marshall, Sr.); U.S. Pat. No. 4,185,849 (Jaeger); U.S. Pat. No. 5,312,150 (Quam); U.S. Pat. No. 5,584,493 (Demski, et al.); U.S. Pat. No. 5,868,412 (Hinkle); U.S. Pat. No. 6,178,264 (Delurey, et al.); U.S. Pat. No. 6,880,843 (Greer, Jr.); U.S. Pat. No. 7,516,997 (Kuznarik, et al.); U.S. Pat. No. 7,448,637 (Parker); U.S. Pat. No. 8,696,005 (Kim); U.S. Pat. No. 8,297,635 (Agoncillo, et al.) and U.S. Patent Publication Nos. 2013/019366 (Kibler); 2014/0167379 (Kibler); and 2018/0265008 (Spahn, et al.);

However, many of these devices involve complex or bulky mechanisms that impact a portion of the flatbed payload carrying area. Thus, in view of the foregoing, there remains a need for a flatbed trailer that provides extendable/retractable steps that do not impact the flatbed payload carrying area and that are easy and safe to use.

All references cited herein are incorporated herein by reference in their entireties.

BRIEF SUMMARY OF THE INVENTION

An apparatus for extending and retracting steps at the rear assembly of a flatbed trailer is disclosed. The apparatus comprises: an upper step and a lower step that can extend or retract through the rear assembly and wherein the lower step protrudes out farther from the rear assembly than does the upper step the said steps are extended in order to form a staggered pair of steps; and each step being coupled to a linkage assembly that extends or retracts the upper and lower steps together.

A method for extending and retracting steps at the rear of a flatbed trailer is disclosed. The method comprises: forming a pair of apertures, one beneath the other, in the rear assembly of the flatbed trailer; inserting a respective step within a respective aperture to form an upper step and a lower step; connecting the steps together using a linkage system which moves the steps together in a first direction away from the flatbed trailer to define an extended position and which moves the steps together in a second direction, opposite the first direction, to define a retracted position, and wherein the steps are staggered when in the extended position such that said lower step protrudes farther away from the rear assembly than the upper step protrudes from the rear assembly.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1A:
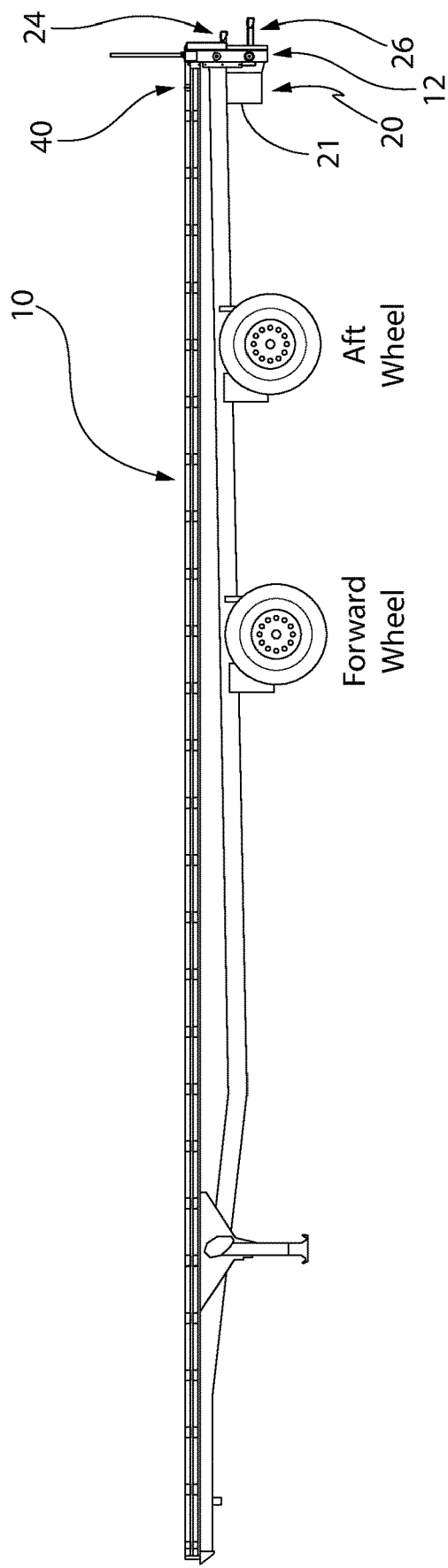
FIG. 1A is a side view of a flatbed trailer with the step assembly of the present invention installed at the rear assembly of the trailer showing the staggered steps in the extended position.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

Figure 1B:
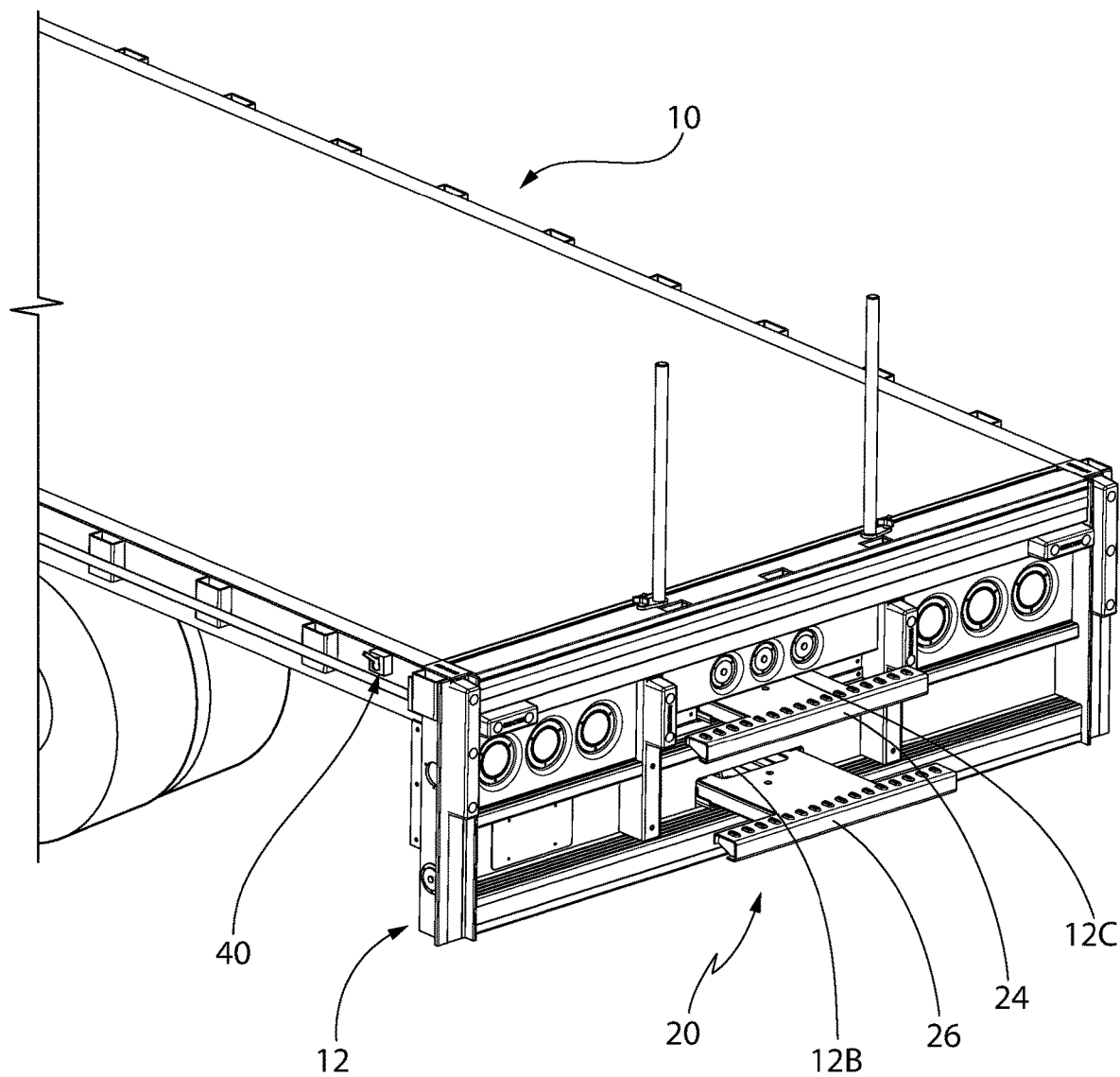
FIG. 1B is a partial isometric view of the flatbed trailer showing the steps of a step assembly of the present invention in an extended position with respect to the trailer rear assembly.
Figure 1C:
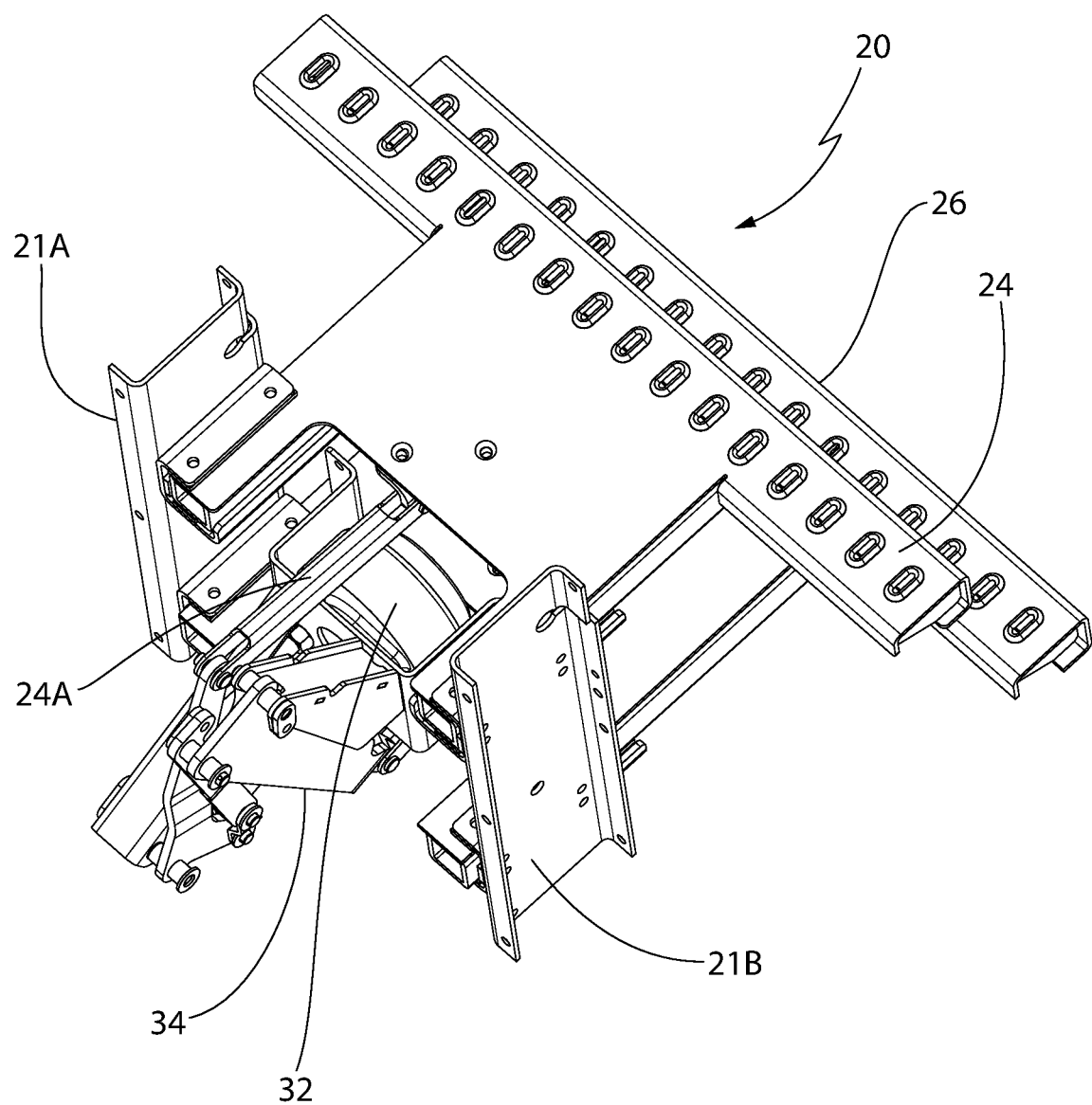
FIG. 1C is an isometric top view of the internals of the step assembly of the present invention with the steps in an extended position.
Figure 1D:
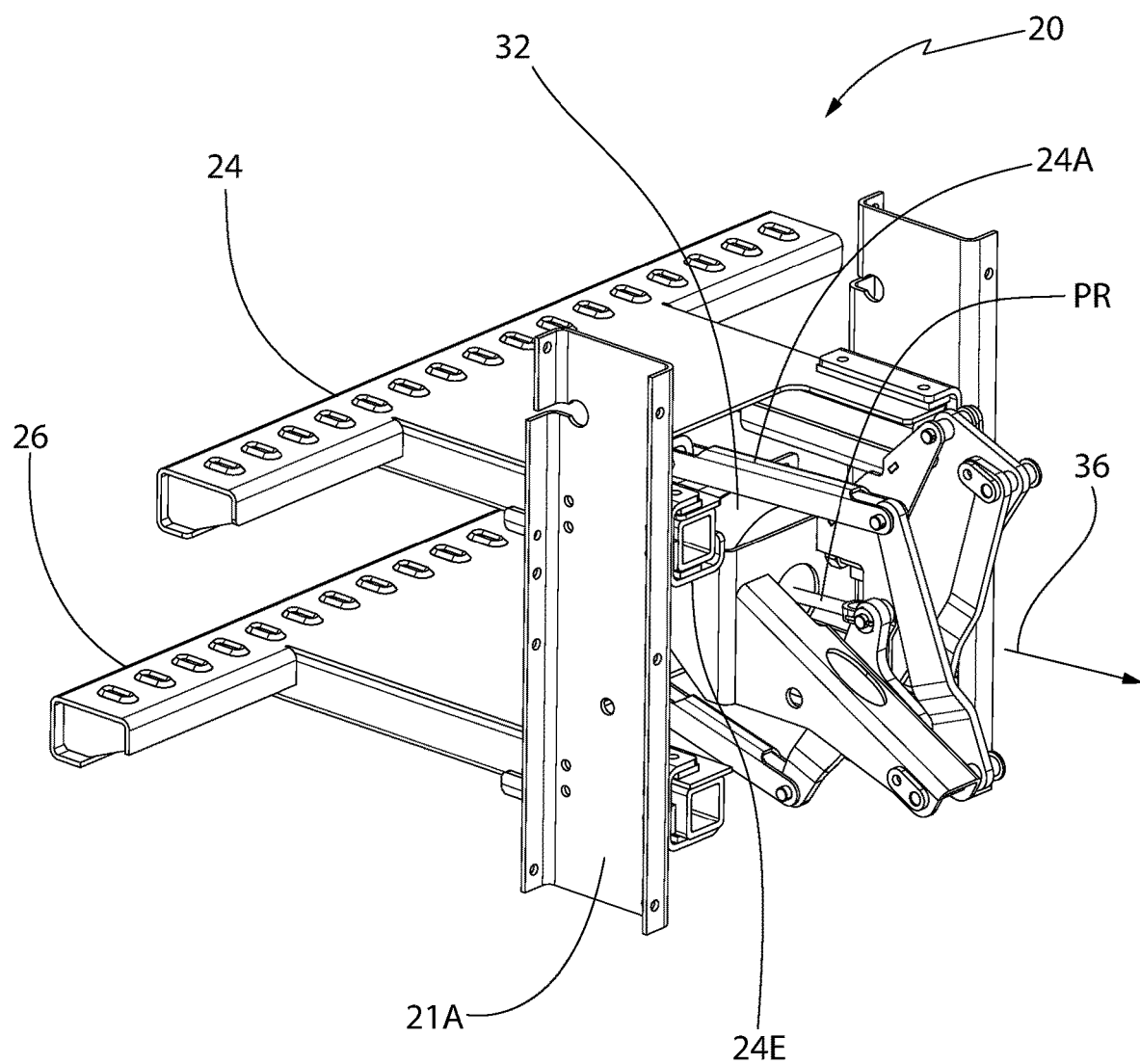
FIG. 1D is an isometric view of the internals of the step assembly of the present invention with the steps shown in the extended position.
Figure 1E:
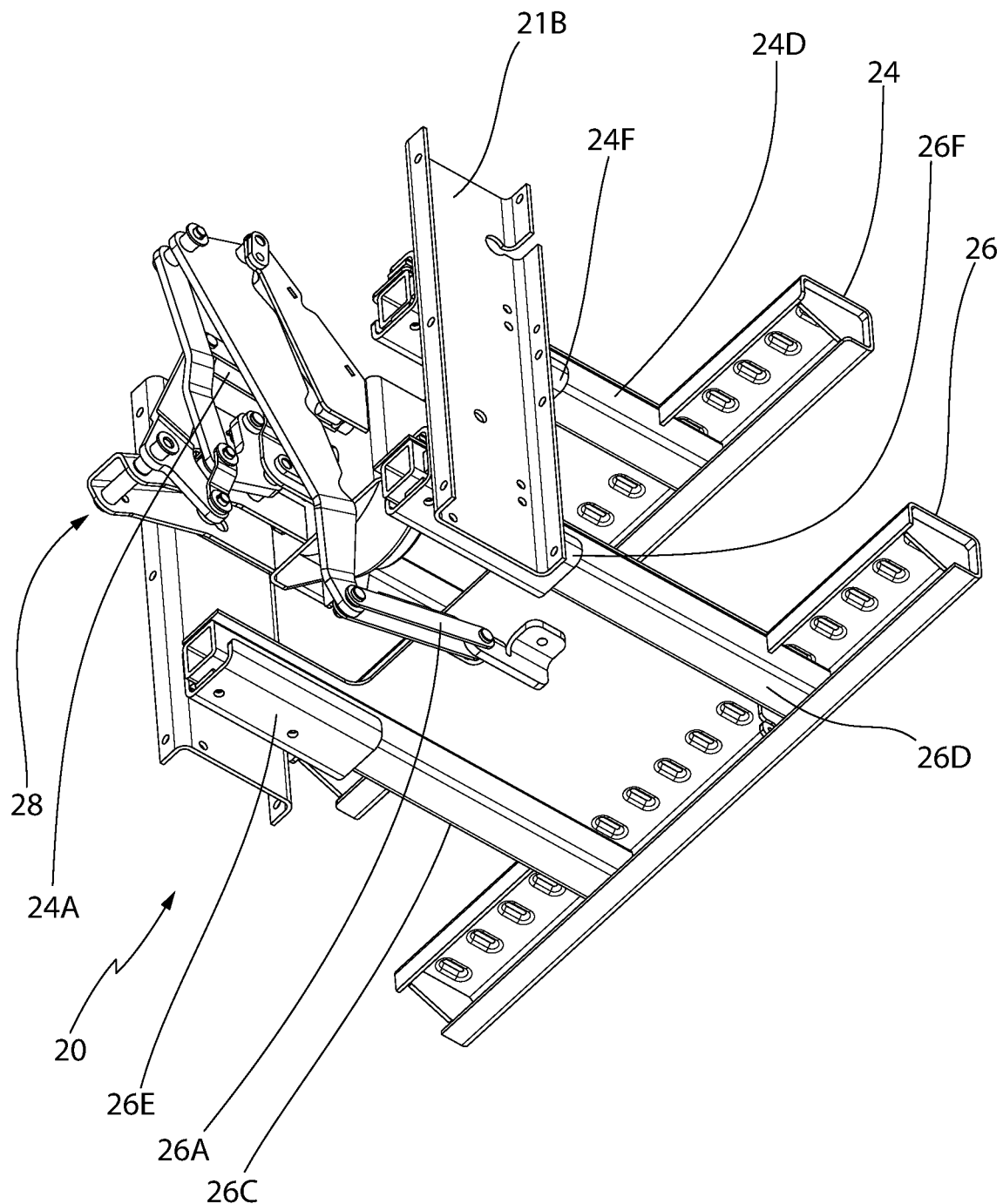
FIG. 1E is an isometric bottom view of the internals of the step assembly of the present invention with the steps in the extended position.
Figure 2A:
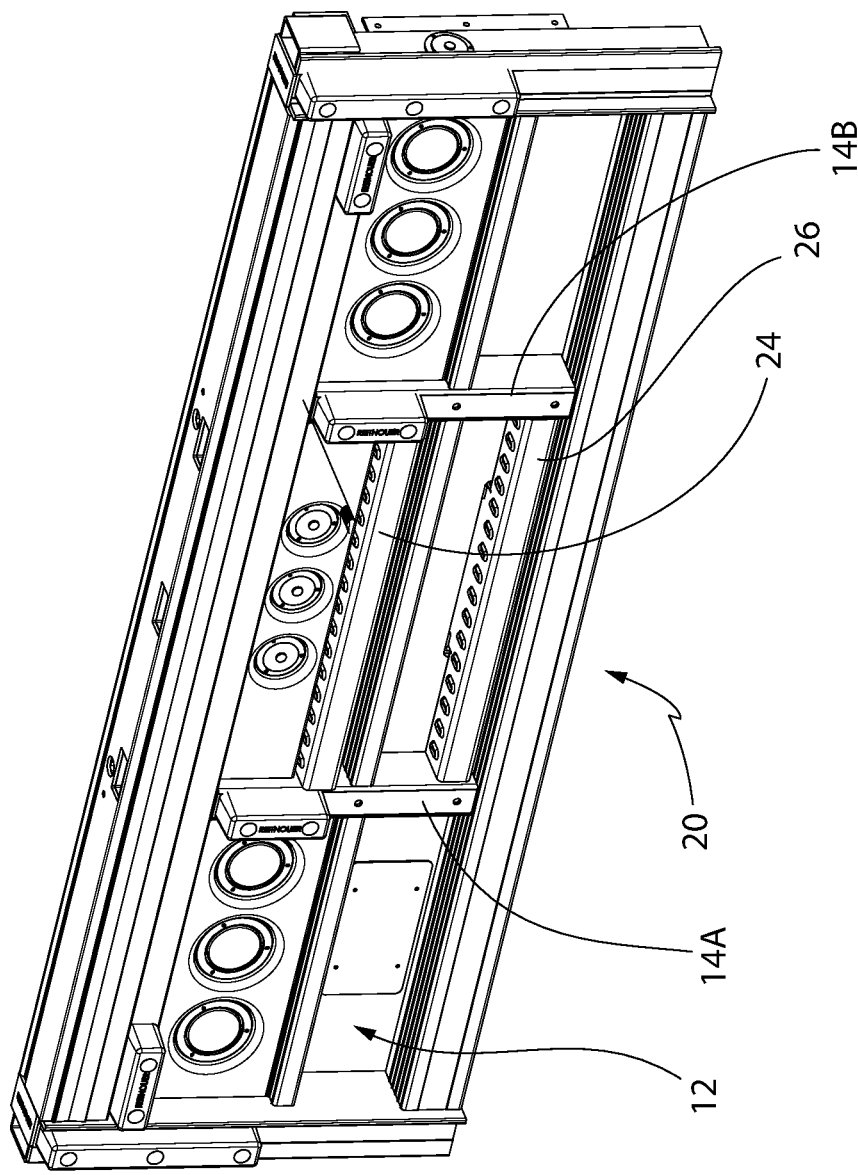
FIG. 2A is a view of the flatbed trailer rear assembly of FIG. 1A showing the steps of the step assembly of the present invention in a retracted position with respect to the trailer rear assembly, with the flatbed trailer portion excluded for simplicity.
Figure 2B:
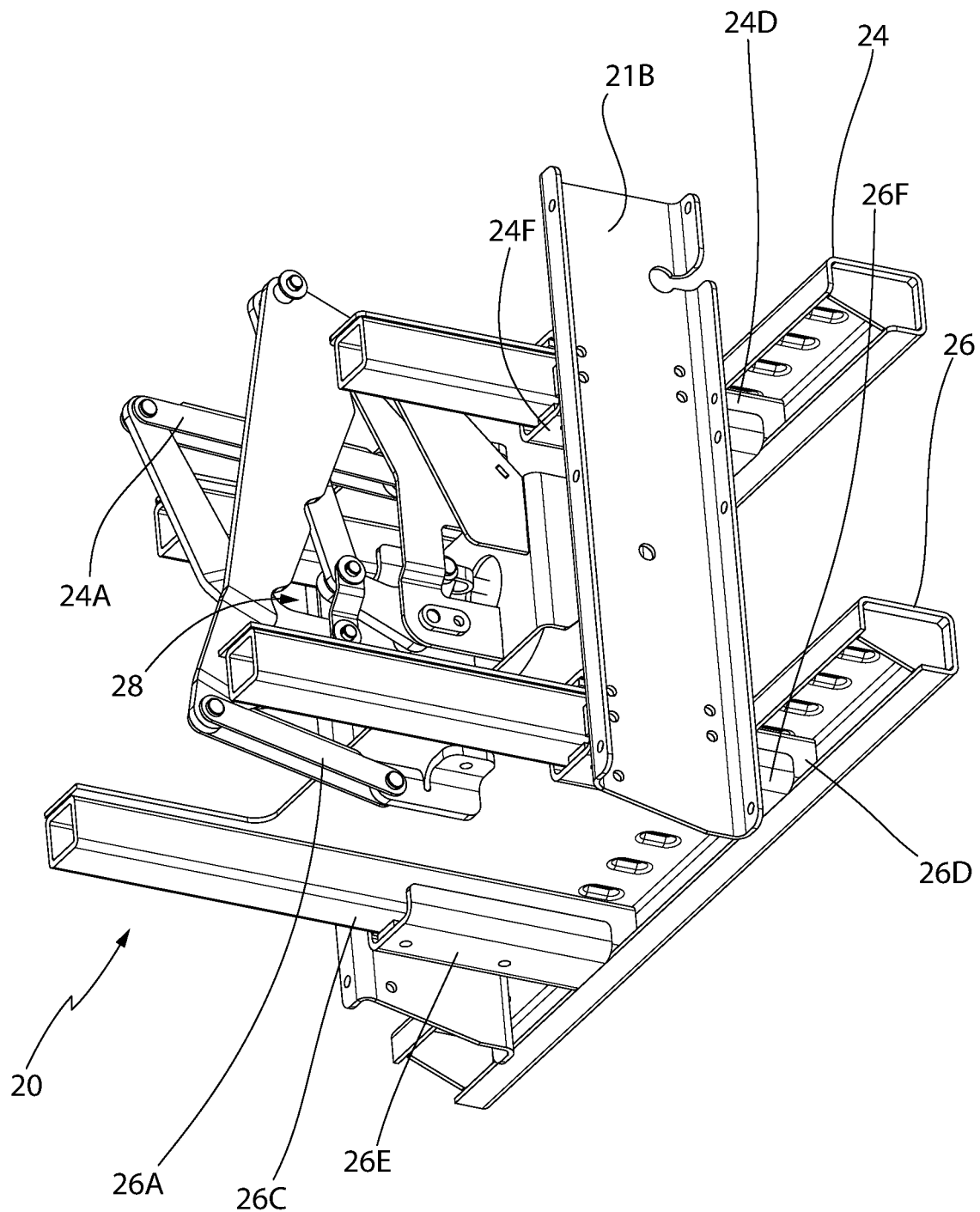
FIG. 2B is an isometric bottom view of the internals of the step assembly of the present invention with the steps in the retracted position.
Figure 2C:
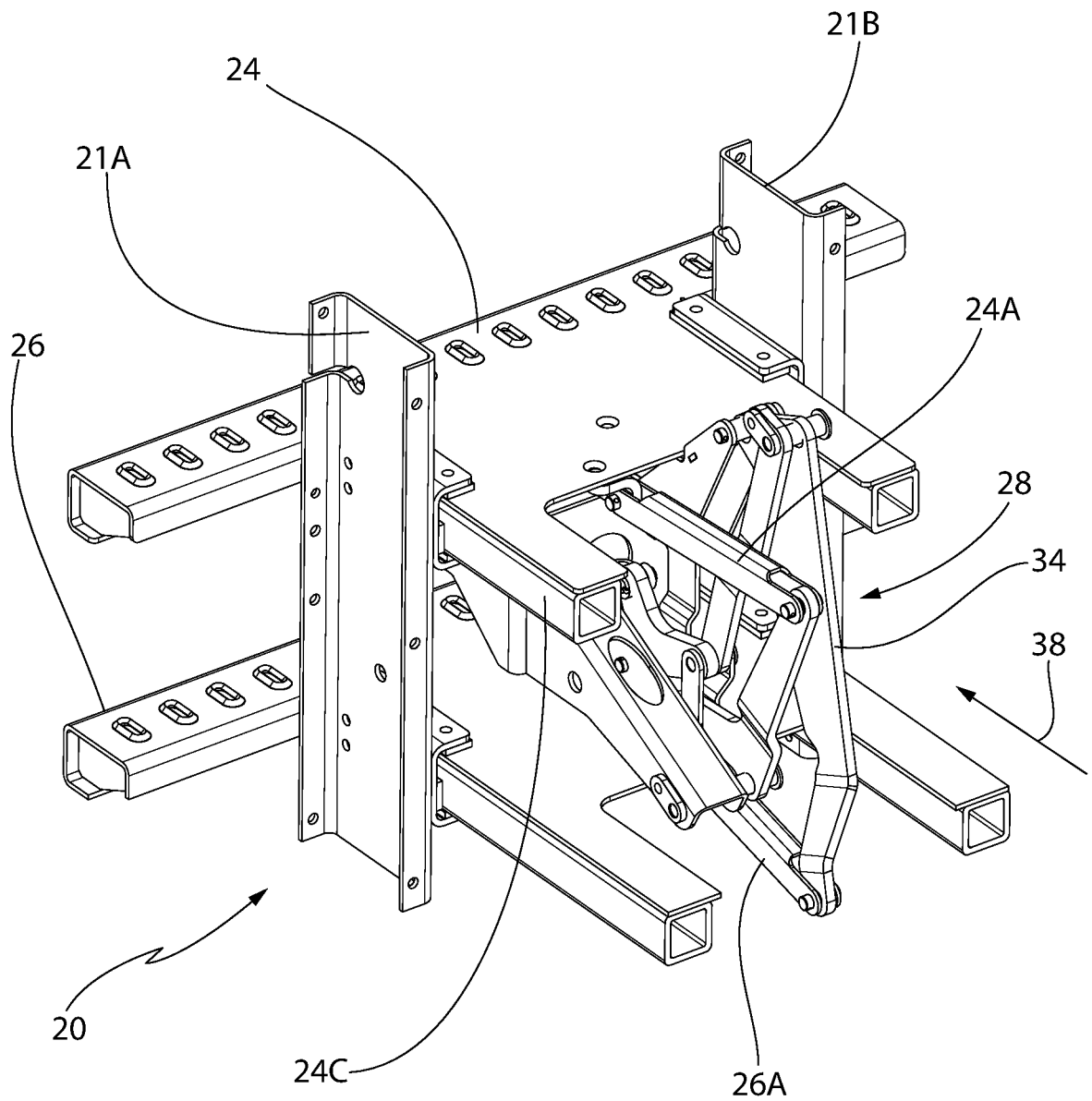
FIG. 2C is an isometric top view of the internals of the step assembly of the present invention with the steps shown in the retracted position.
Figure 3:
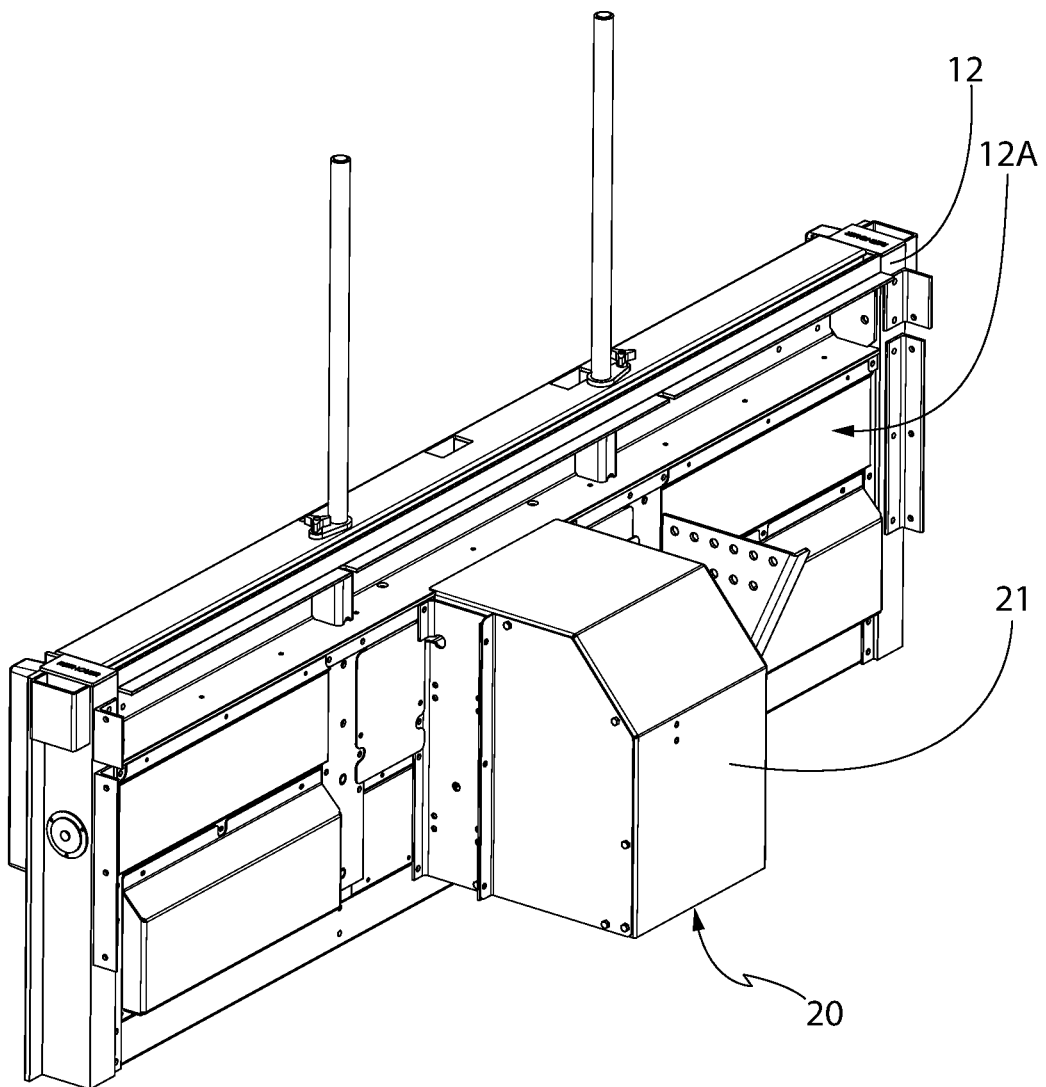
FIG. 3 is an isometric view of the interior side of the rear assembly showing the step assembly mounted against the rear assembly, with the flatbed trailer portion excluded for clarity.

As shown in FIGS. 1A-1B and 3, the invention comprises an assembly 20 that can be attached to the end of a flatbed trailer 10, particularly, to the rear assembly 12 of the flatbed trailer 10. The invention comprises two extendable/retractable steps 24 and 26 that are staggered (viz., they each extend at a different outward distance, as shown in FIGS. 1A-1E) to allow a person to step up (or down) on to the flatbed trailer 10. The steps 24 and 26 are parallel to each other. The inventive steps do not reach down to the ground but simply protrude outwardly, through apertures 12B and 12C (FIG. 1B), from the rear assembly 12 of the flatbed trailer 10. Because the steps 24/26 are staggered, the user can climb them, up or down, much like a stairwell. Conversely, when the steps 24/26 are retracted (FIGS. 2A-2C), they do not protrude outwardly from the rear assembly 12 (see FIG. 2A) and therefore do not pose any projection hazard; for example, as seen in FIG. 2A, the retracted steps 24/26 do not project outwardly beyond the vertical members 14A and 14B.

FIGS. 1C-1E and FIGS. 2B-2C depict the linkages that are used to either extend or retract the steps 24/26 from the assembly 20. The linkages are contained within an assembly housing 21 that is releasably secured to the inside surface 12A of the rear assembly 12 (FIG. 3). Each step 24/26 has a respective driver link 24A and 26A that is coupled at one end to the respective step 24/26 and the other end to a common linkage assembly 28. As a result, the steps 24/26 are either extended together or retracted together and are thus not driven independently. Each step 24/26 has a pair of rails 24C/24D and 26C/26D on their undersides that ride inside respective guides 24E/24F and 26E/26F for maintaining the alignment of the steps 24/26 during extension and retraction. The guides 24E/24F and 26E/26F are secured to vertical supports 21A/21B within the assembly housing 21.

The steps 24/26 and linkage assembly may comprise aluminum. By way of example only, each step 24/26 comprises a "T-shaped" appearance (see for example, FIGS. 1C-1E and 2B). The linkage assembly 28 is configured to extend the forward edges of these steps 24/26 at distinct distances away from the rear assembly 12 to form the "staggered" configuration so that the steps 24 and 26 do not completely overlap (see FIGS. 1A and 1C, for example), thereby allowing a user to step up from the ground, or step down from the trailer bed, during use as in conventional steps.

Although it is within the broadest scope of the present invention to include the step assembly 20 to be manually activated whereby the operator can pull the steps 24/26 outward from the rear assembly 12 to extend them and then lock them in place or release the lock and then push them into the rear assembly 12 to retract them, the preferred method is to have the steps 24/26 automatically controlled, along with a safety retraction feature.

By way of example only, a pneumatic control system 30 (FIGS. 4A-4B) is depicted for automatically extending/retracting the steps 24/26. In particular, the linkage assembly 28 comprises a pneumatic actuator 32 (e.g., 430055 service chamber manufactured/sold by TSE Brakes as part no. 20SCL2H-3397) which drives a main link 34 of the common linkage assembly 28 for extending and retracting the steps 24/26. The pneumatic actuator 32, shown in an exploded state in FIG. 5 for clarity, may comprise a diaphragm D, push plate PP/push rod PR and a return spring RS configured such that when air pressure is applied to the diaphragm D, the diaphragm D drives the push plate PP/push rod PR in opposition to the return spring RS; conversely, when air pressure is removed, the return spring RS acts to return the push plate PP/push rod PR to a neutral release position. As such, when air pressure is applied to the pneumatic actuator 32, the main link 34 is driven in the direction of arrow 36 (FIG. 1D), thereby causing the main link 34 to move the driver links 24A and 26A in the opposite direction, causing the steps 24/26 to extend outward from the rear assembly 12, as shown in FIGS. 1A-1D. Conversely, when air pressure is removed from the pneumatic actuator 32, the return spring RS causes the push rod PR and main link 34 to move in the direction of arrow 38 (FIG. 2C), causing the driver links 24A and 26A to retract the steps 24/26 into the rear assembly 12.

Figure 4A:
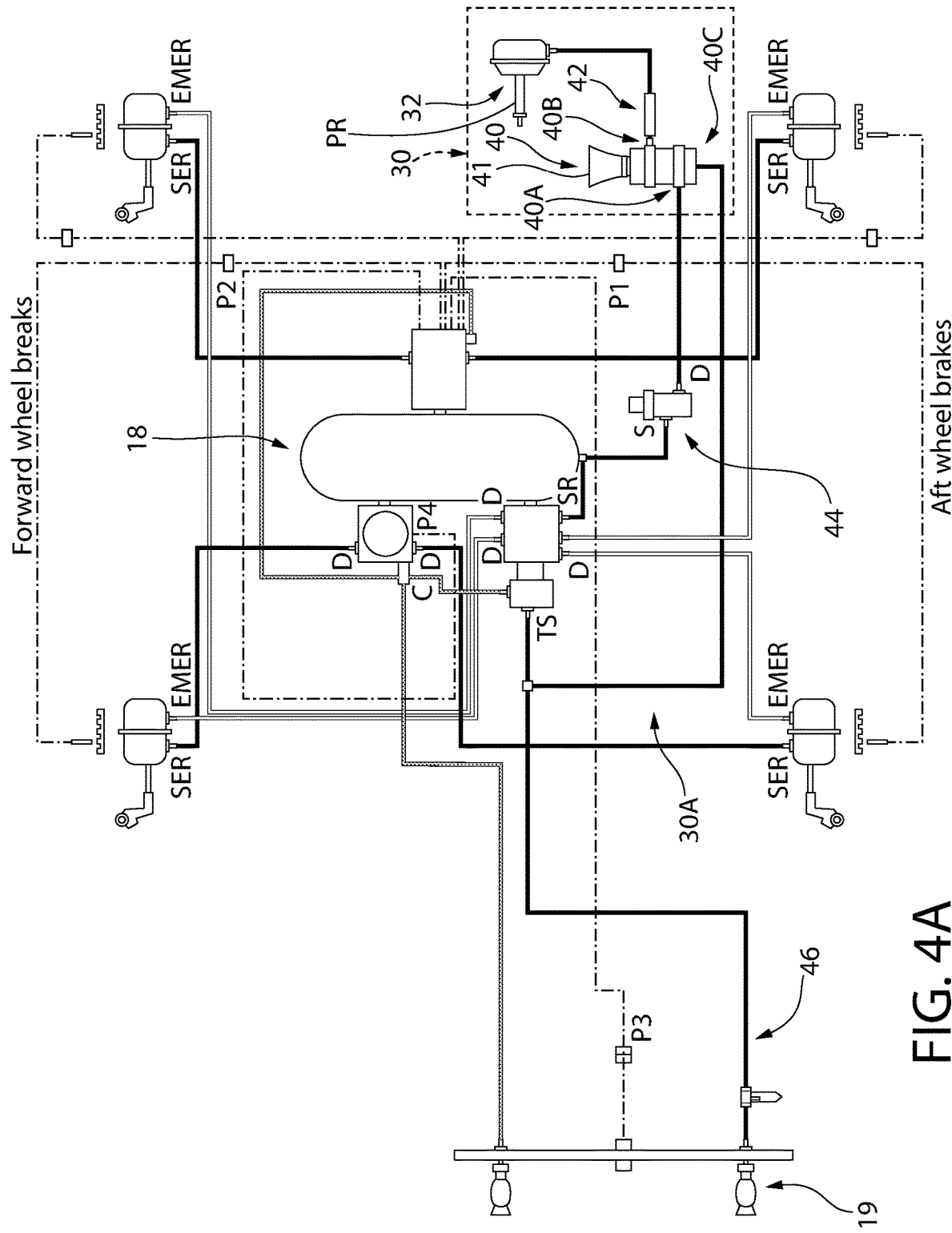
FIG. 4A is an exemplary diagram showing how the automatic control system for extending and retracting the steps is interfaced with the flatbed trailer air brake system.
Figure 4B:
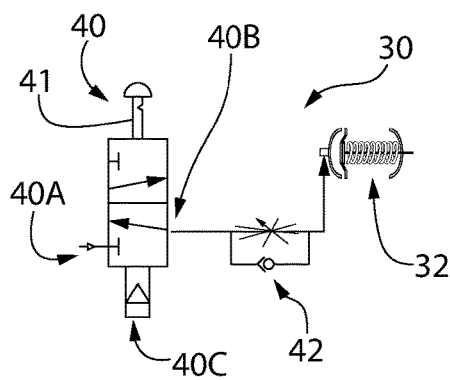
FIG. 4B is a functional diagram of the main components of the automatic control system.
Figure 5:
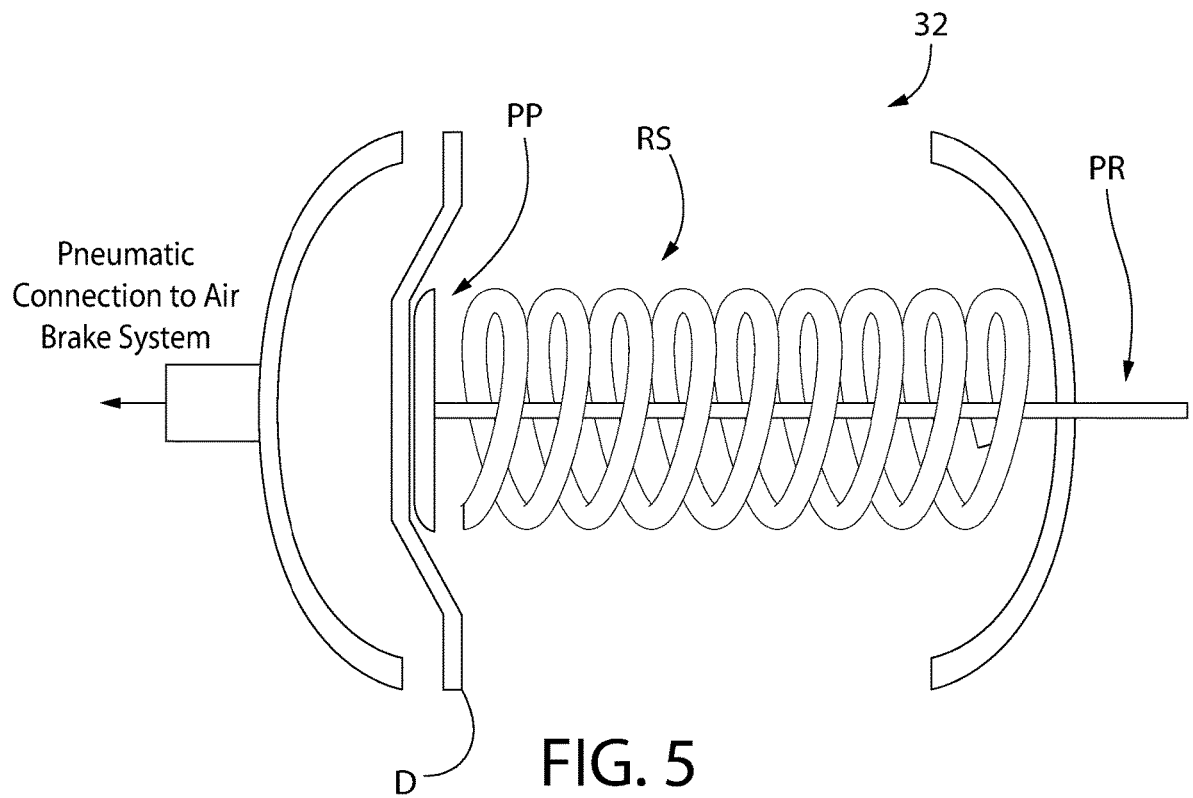
FIG. 5 is an exploded view of an exemplary pneumatic actuator for use in the automatic control system of the step assembly.

As shown in FIGS. 4A-4B, the automatic control system 30 for controlling the extension/retraction of the steps 24/26 comprises a switch 40, a regulator 42 and the pneumatic actuator 32 which are coupled into the air brake system of the flatbed trailer 10. The switch 40 may comprise an auto reset valve (e.g., 450224 auto reset valve manufactured/sold by CS Automation as part no. TD-6210) that is located at the rear portion of the flatbed trailer, on the rear assembly 12 or on the side rail 16 of the trailer (see FIG. 1B). The auto reset valve comprises a first port 40A pneumatically coupled to the brake system air tank 18 via a valve 44, an output port 40B coupled to the pneumatic actuator 32 via the regulator valve 42 (e.g., 6692K12 air flow control valve), and a third override port 40C coupled to an airline 46 which is connected to one of the glad-hands 19 that connects between the tractor (not shown) brake controls and the flatbed trailer 10. The regulator valve 42 maintains the air pressure to the pneumatic actuator 32 so that the steps 24/26 are not extended or retracted at too high a velocity during operation since the overall air brake system may be pressurized at 100 lbs./in. By way of example only, the switch 40 may comprise a lever 41 that can be displaced by the operator in one direction to extend the steps 24/26 and then displaced in the opposite direction to retract the steps 24/26 or vice versa.

During operation, once the flatbed is properly parked at the delivery/pick-up location with the emergency brakes on, the operator will go to the back of the flatbed trailer 10 and activate the switch 40 which will extend the stairs 24/26 as shown in FIG. 1A. The operator can then proceed to use the steps 24/26. When delivery or pick-up is complete, the operator will activate the switch 40 to retract the steps 24/26. The operator can then enter the tractor portion, release the emergency brakes and proceed to his/her requisite destination. However, if the operator were to forget to activate the switch 40 to retract the steps 24/26 and entered the tractor and then released the emergency brakes to drive off to the requisite destination, the act of releasing the emergency brakes causes the override pathway 30A to be operative which would automatically shut off air pressure to the pneumatic actuator 32, thereby automatically retracting the steps 24/26.

To install the apparatus 20 onto a flatbed trailer 10, apertures 12B/12C are formed in the rear assembly 12 to allow passage of the steps 24 and 26 as described above. Flanges on the housing 21 allow the housing 21 of the apparatus 20 to be secured to the back side 12A of the rear assembly 12 using fasteners (e.g., screws, bolts, rivets, etc.). A pneumatic connection is made to the pneumatic actuator 32 inside the housing 21 to connect the actuator 32 to the regulator 42 and output port 40C of the switch 40. The input port 40A of the switch 40 is connected through the valve 44 to the air tank 18 of the air brake system. The override path 30A is coupled to the override port 40C of the switch and to the air line 46 connected to one of the glad-hands 19.

As can be appreciated by all of the foregoing, the steps 24 and 26 permit an operator to climb up to the trailer bed 10, or climb down from the trailer bed 10 to the ground without the steps 24/26 making any contact with the ground nor impacting any area of the trailer storage area. In other words, there is no structure that needs to span the distance between the flatbed trailer and the ground; moreover, in the retracted state, the steps 24 and 26 do not diminish any part of the trailer bed payload hauling area.

It should be further understood that the linkage assembly 28 is shown by way of example. It is within the broadest scope of the present invention 20 to include various ways of connecting the upper and lower steps 24/26 together such that they can be extended and retracted together.

While the invention has been described in detail and with reference to specific examples thereof, it will be apparent to one skilled in the art that various changes and modifications can be made therein without departing from the spirit and scope thereof.

What is claimed is:

1. An apparatus for extending and retracting steps at the rear assembly of a flatbed trailer, said apparatus comprising:
   an upper step and a lower step that can extend or retract through the rear assembly and wherein said lower step protrudes out farther from the rear assembly than does said upper step when said steps are extended in order to form a staggered pair of steps;
   each step being coupled to a linkage assembly that extends or retracts said upper and lower steps together, each step extending and retracting through a respective aperture in the rear assembly of the flatbed trailer; and
   an automatic control system for automatically extending and retracting said upper and lower steps, said automatic control system comprising a switch coupled between an air brake system of the flatbed trailer and a pneumatic actuator connected to said linkage assembly, said switch being controllable to allow an operator to extend said steps and to retract said steps.

2. The apparatus of claim 1 wherein each step comprises a rail on each side of said step, each of said rails sliding on a guide secured to said housing to maintain an alignment of each of said steps, each of said rails being horizontal when said steps are extended and retracted.

3. The apparatus of claim 1 wherein said automatic control system further comprises a regulator installed between said switch and said pneumatic actuator for controlling the speed at which said steps are extended and retracted.

4. The apparatus of claim 1 wherein said pneumatic actuator comprises a service chamber.

5. The apparatus of claim 1 wherein said switch is an auto reset valve.

6. The apparatus of claim 1 wherein said automatic control system further comprises an override path for automatically retracting said steps whenever the operator fails to retract said steps with said switch and the emergency brakes of the flatbed trailer are released.

7. The apparatus of claim 6 wherein said override path comprises a pneumatic connection between said switch and an air brake line coupled to a glad-hand of the flatbed trailer.

8. The apparatus of claim 1 wherein said switch operates to extend said steps when air pressure is passed through said switch to said pneumatic actuator and operates to retract said steps when said switch blocks air pressure to said pneumatic actuator.

* * * * *